United States Patent
Topiwala et al.

(10) Patent No.: US 11,206,404 B2
(45) Date of Patent: Dec. 21, 2021

(54) ADAPTIVE RESOLUTION CHANGE IN VIDEO STREAMS

(71) Applicant: FastVDO LLC, Melbourne, FL (US)

(72) Inventors: Pankaj N. Topiwala, Cocoa Beach, FL (US); Madhu Peringassery Krishnan, Columbia, MD (US); Wei Dai, Clarksville, MD (US)

(73) Assignee: FastVDO LLC, Melbourne, FL (US)

( * ) Notice: Subject to any disclaimer, the term of this patent is extended or adjusted under 35 U.S.C. 154(b) by 0 days.

(21) Appl. No.: 16/922,976

(22) Filed: Jul. 7, 2020

(65) Prior Publication Data
US 2021/0014497 A1    Jan. 14, 2021

Related U.S. Application Data

(60) Provisional application No. 62/871,599, filed on Jul. 8, 2019.

(51) Int. Cl.
| | |
|---|---|
| *H04N 19/132* | (2014.01) |
| *H04N 19/196* | (2014.01) |
| *H04N 19/176* | (2014.01) |
| *H04N 19/159* | (2014.01) |
| *H04N 19/52* | (2014.01) |
| *H04N 19/577* | (2014.01) |
| *H04N 19/139* | (2014.01) |

(52) U.S. Cl.
CPC ......... *H04N 19/132* (2014.11); *H04N 19/139* (2014.11); *H04N 19/159* (2014.11); *H04N 19/176* (2014.11); *H04N 19/196* (2014.11); *H04N 19/52* (2014.11); *H04N 19/577* (2014.11)

(58) Field of Classification Search
None
See application file for complete search history.

(56) References Cited

U.S. PATENT DOCUMENTS

| | | | |
|---|---|---|---|
| 8,155,462 B2 | 4/2012 | Tran et al. | |
| 2020/0374552 A1* | 11/2020 | Skupin | H04N 19/70 |
| 2020/0404279 A1* | 12/2020 | Choi | H04N 19/196 |

OTHER PUBLICATIONS

Chen, T. et al., "Multidimensional Multirate Filters and Filter Banks Derived from One-Dimensional Filters," IEEE Transactions on Signal Processing, May 1993, pp. 1749-1765, vol. 41, No. 5.

(Continued)

*Primary Examiner* — Christopher G Findley
(74) *Attorney, Agent, or Firm* — Fenwick & West LLP

(57) ABSTRACT

A video coding system in which video images of a video bitstream are rescaled prior to encoding, and again at the decoder upon reception. When encoding a given video frame, the video encoder deduces a level of resampling to apply to a reference frame in order to properly predict blocks in the given video frame or the full given video frame, and carries out one or more predictions by first applying a resampling process on the reference frame data at the deduced level. To decode the given video frame of the bitstream, a video decoder compares a size of the given video frame to sizes of a reference frame to determine a level of resampling for the reference frame data, and carries out predictions to generate predicted data by first applying the determined level of resampling to the reference frame data.

20 Claims, 7 Drawing Sheets

(56) References Cited

OTHER PUBLICATIONS

Bross, B. et al., "Versatile Video Coding (Draft 5)," Joint Video Experts Team (JVET) of ITU-T SG 16 WP 3 and ISO/IEC JTC 1/SC 29/WG 11, Mar. 19-27, 2019, 407 pages, No. JVET-N1001-v10.

Dai, W. et al., "Advanced Resampling Filters for HEVC Applications," Joint Collaborative Team on Video Coding (JCT-VC) of ITU-T SG16 WP3 and ISO/IEC JTC1/SC29/WG11, Nov. 21-30, 2011, eight pages, No. JCTVC-G862.

Dai, W., et al., "Advanced Resampling Filters for Spatial Scalability and Chroma Sampling Applications in HEVC," Joint Collaborative Team on Video Coding (JCT-VC) of ITU-T SG16 WP3 and ISO/IEC JTC1/SC29/WG11, Jul. 14-22, 2011, 43 pages, No. JCTVC-F618r3, with supplemental material.

Davies, T., "AHG18: Adaptive Resolution Coding (ARC)", Joint Collaborative Team on Video Coding (JCT-VC) of ITU-T-SG16 WP3 and ISO/IEC JTC1/SC29/WG11, Nov. 21-30, 2011, 256 pages, No. JCTVC-G264, with supplemental material.

Davies, T., "Resolution switching for coding efficiency and resilience," Joint Collaborative Team on Video Coding (JCT-VC) of ITU-T-SG16 WP3 and ISO/IEC JTC1/SC29/WG11, Jul. 14-22, 2011, 24 pages, No. JCTVC-F158, with supplemental material.

Hendry, F. et al., "On adaptive resolution change (ARC) for VVC," Joint Video Experts Team (JVET) of ITU-T SG 16 WP 3 and ISO/IEC JTC 1/SC 29/WG 11, Jan. 9-18, 2019, three pages, No. JVET-M0135-v1.

International Telecommunication Union, "Video coding for low bit rate communication," ITU-T, Telecomiunication Standardization Sector of ITU, Jan. 2005, 226 pages, No. H.263.

Tran, T. D. et al., "Advanced Extended Spatial Re-sampling Filters for SVC," Joint Video Team (JVT) of ISO/IEC MPEG & ITU-T VCEG (ISO/IEC JTC1/SC29/WG11 and ITU-T SG16 Q.6), Jan. 13-19, 2007, 16 pages, No. JVT-V030, with supplemental material.

* cited by examiner

ADAPTIVE RESOLUTION CHANGE IN VIDEO STREAMS

CROSS-REFERENCE TO RELATED APPLICATION

This application claims priority under 35 U.S.C. § 119(e) from U.S. Provisional Patent Application No. 62/871,599, entitled "Adaptive Resolution Change (ARC) in VVC" filed on Jul. 8, 2019, which is incorporated by reference herein in its entirety.

BACKGROUND

The disclosure generally relates to the field of image and video compression, and more specifically to rescaling the resolution of image or video frames in a coded stream, while still allowing decoded display at the receiver at a fixed resolution.

Modern video codecs may be used for image coding, and video coding, for storage, transmission, and playback. In many video codecs, the first frame of a video, having no prior information, must be coded independently (thus treated as an image), what is called an I frame, while the remaining frames may be coded by applying various predictors, and thus called predicted frames, which are predicted from other previously coded frames. Those other previously coded frames used for reference in the prediction process are called reference frames, which may in fact occur either in the past, or future of the current frame. That is, the coding and decoding order of video frames need not be same as the capture or display order.

In the simplest terms, the predicted frames may refer to either one reference frame, and called P frames, or two reference frames, and are called bi-predictive or B frames. Since the reference frames may themselves be predicted, more complicated structures can also arise, including hierarchical prediction frameworks, used in video coding standards such as AVC, HEVC, and VVC.

In general, the predicted frames of type either P or B require far less bandwidth for their representation and transmission than do I frames for similar quality of reconstruction. Thus, it is more efficient in terms of bitrate (or in transmission, of instantaneous bandwidth) to use predicted frames as much as possible. Nevertheless, I frames are often repeated intermittently in the stream, since only they can be randomly accessed in the stream; random access enables desirable features like fast forward and rewind, useful for many consumer applications like video on demand.

SUMMARY

Embodiments are directed to mechanisms for rescaling video images prior to encoding, and again at the decoder upon reception. This permits applications to navigate dramatic changes in instantaneous bandwidth, for which other methods such as rate control and rate scaling may not be adequate. Typically, the intention is to have the display render a fixed resolution stream, even while the encoding and decoding processes may work with changing resolutions. While there are a number of processes in encoding that need not be standardized or specifically represented in the bitstream (for example, how motion estimation is performed), allowing changing the resolution of a video frame generally requires normative elements in the bitstream, and in particular, for the bitstream syntax of the VVC standard.

Embodiments are directed to a computer-implemented method for encoding a video bitstream with adaptive resolution change. In some embodiments, the video encoder signals at a sequence parameter set level a notional size of video frames of a video bitstream, and signals at the sequence parameter set level or at a picture parameter set level that resampling is enabled in the video bitstream. The video encoder further signals, for a given video frame, an actual size of the given video frame after optional resampling, in terms of height and width, at the picture parameter set of the given video frame. When encoding the given video frame, the video encoder deduces a level of resampling to apply to data from a reference frame, at either block or full-frame level, in order to properly predict blocks in the given video frame or the full given video frame (e.g., a level of resampling to match the sizes of the reference frame and the given video frame, or blocks thereof), and carries out one or more predictions by first applying a resampling process on the reference frame data at the deduced level, at the block of full frame level.

In some embodiments, a video decoder is configured to decode a video bitstream with adaptive resolution change. In some embodiments, the video decoder identifies a notional size of video frames of a video bitstream from a sequence parameter set of the video bitstream, and, from the sequence parameter set or a picture parameter set of a given video frame of the video bitstream, determines that resampling is enabled for the given video frame. The video decoder decodes the given video frame using a width and height given in the picture parameter set of the given video frame. The video decoder may further compare a size of the given video frame to sizes of one or more reference video frames to determine a level of resampling for reference frame data of the one or more reference video frames (e.g., a level of resampling to match the sizes of the reference frame and the given video frame, or blocks thereof), and carries out predictions to generate predicted data by first applying the determined level of resampling to the reference frame data, at the block of full frame level. The video decoder adds the predicted data, at either block or full-frame level, to residual data of the given video frame to generate a decoded video frame.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

In video coding, different types of frames require different instantaneous bandwidths. As such, the representation and transmission of video are impacted by considerations of the available instantaneous bandwidth in a communications channel. In modern video services, and especially streaming services, the available bandwidth to a receiving terminal within a network may not be constant but vary over time. In response to bandwidth variability over time, it is desirable to be able to vary the instantaneous bandwidth required in representing and transmitting the stream. There are a number of mechanisms available in a modern video codec to deal with bandwidth variability at a fine granular level (e.g., using rate control), but which are not adequate when the channel bandwidth varies more substantially.

Embodiments are directed to mechanisms for rescaling video images prior to encoding, and again at the decoder upon reception. This permits applications to navigate dramatic changes in instantaneous bandwidth, for which other methods such as rate control and rate scaling may not be adequate. Typically, the intention is to have the display render a fixed resolution stream, even while the encoding and decoding processes may work with changing resolutions. While there are a number of processes in encoding that need not be standardized or specifically represented in the bitstream (for example, how motion estimation is performed), allowing changing the resolution of a video frame generally requires normative elements in the bitstream, and in particular, for the bitstream syntax of the VVC standard.

Figure 1:
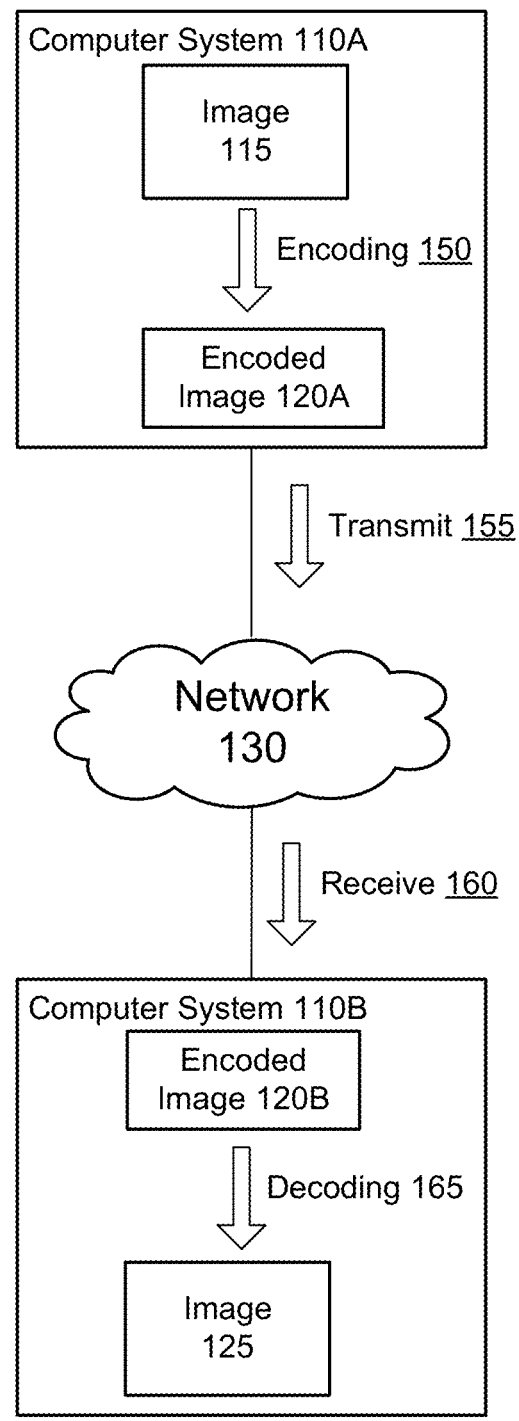
FIG. 1 is a high-level block diagram that illustrates a computing environment for encoding and decoding images/videos, in accordance with some embodiments.

FIG. 1 is a high-level block diagram that illustrates a computing environment 100 for encoding and decoding images/videos (as an image is just a special case of a video with one frame, herein collectively referred to as videos), according to one embodiment of the present disclosure. As shown, the computing environment 100 includes two computer systems 110A and 110B connected through a network 130. In one embodiment, the computer system 110 is a conventional computer system executing, for example, a Microsoft Windows-compatible operating system (OS), Apple OS X, and/or a Linux distribution. In another embodiment, the computer system 110 can be a device having computer functionality, such as a personal digital assistant (PDA), mobile telephone, video game system, etc.

The network 130 enables communications between the computer systems 110. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The computer system 110A encodes 150 an original video 115 to generate an encoded video 120A. The original video can be, for example, a still image or the frames of a video. The encoding 150 compresses the original video 115 to produce an encoded, or "compressed," video 120A that represents the original video using less information (e.g., fewer bits) compared to the original video 115. The encoded video 120A thus provides for efficient storage of the information in the original video 115.

The encoded video 120A also allows for efficient transmission 155 of the information in the original video 115 over the network 130. For example, the encoded video 120A can be transmitted 155 by the computer system 110A over the network 130 and received 160 by computer system 110B. The encoded video 120B received by computer system 110B represents the copy of encoded video 120A held by computer system 110A. The computer system 110B can decode 165 the encoded video 120B to obtain a replica 125 of the original video or an approximation of the original video, the "decompressed" video. This transmission scenario can occur, for example, when a user is using computer system 110B to browse the web and download images or videos from web sites. The videos can be still images, frames of videos stored in a file videos streamed to computer system 110B. The encoding/decoding techniques described herein can also be used in non-networked environments.

In one embodiment, the encoding process 150 used by computer system 110A uses a block-based technique. In this technique, the video frame is divided into a set of blocks, such as blocks of 16×16 pixels. The blocks are encoded in a specified sequence, such as a scan-line order from left-to-right, top-to-bottom. A block in the video frame to be encoded, called a "target block," is encoded by describing the differences between the target block and another block in the reference video frame, called the "reference block." Said another way, the reference block is used to "predict" the target block, and the resulting difference (error) of this prediction is encoded.

The degree of the encoding (i.e., amount of compression) is determined in part by the amount of information required to predict the target block from the reference block and the amount of information required to identify the reference block. An embodiment of the encoding process 150 provides a set of candidate blocks from which to select the reference block, and also provides an efficient way to identify the selected block. The residual information and the position of the reference block in a sequence of candidate source blocks is stored in the compressed image.

The corresponding decoding process 165 decodes the encoded image 120B block-by-block. Blocks of the image 125 that have been decoded may be used to decode subsequent blocks. Aspects of the image using during encoding, such as the ranks of the candidate source regions are reconstructed during decoding and used to produce the replica 125 of the original image 115.

Figure 2:
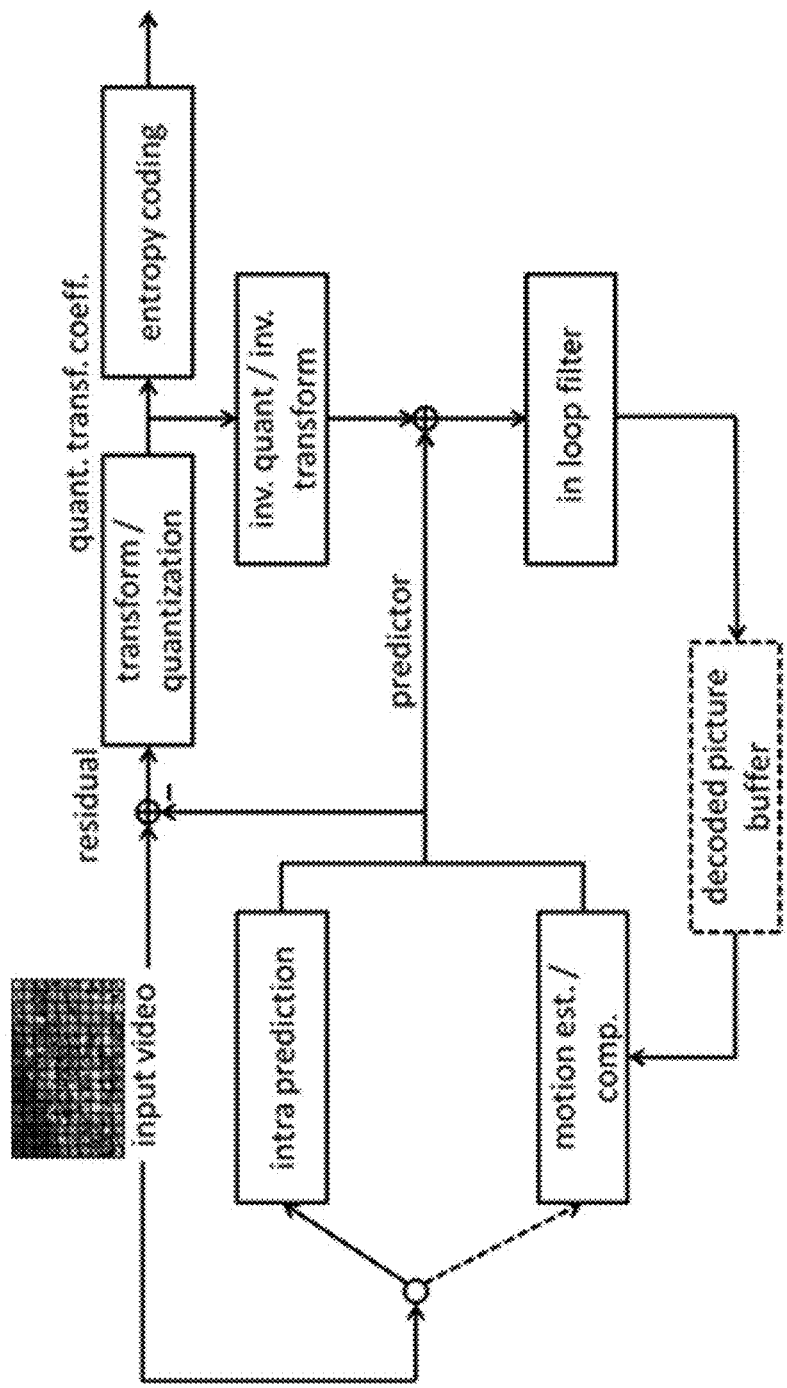
FIG. 2 illustrates a block diagram of a video coding system, in accordance with some embodiments.

FIG. 2 illustrates a block diagram of a video coding system, in accordance with some embodiments. The video coding system of FIG. 2 may be used to perform the encoding 150 illustrated in FIG. 1. As illustrated in FIG. 2, an input video (e.g., an unprocessed source video) is processed by an encoder including an intra-prediction module and/or a motion estimation/compensation module to generate a spatial or temporal prediction. The prediction is used to generate a residual representing the difference between the prediction and the original video. The residual may be transformed and quantized to generate quantized transformed coefficients to be coded. In addition, the quantized transformed coefficients may be subject to inverse quantization and transformation for use in reconstructing block from previous frames for use in motion estimation.

In some embodiments, the encoder rescales video images of a video bitstream prior to encoding, and decoder rescales the images when decoding, to produce an output video of uniform resolution. The process of changing the resolution of an image or video frame is called resampling, which includes both down-sampling and up-sampling processes. To change resolution of an input video frame, a resampling filter is applied, after which it is resampled at a resolution different from the original one. In some embodiments, whatever the resolution of a frame going into the encoder, the decoder would normally produce a frame at the same resolution; that is, if a frame has been resized to half the original height and width at the encoder, the decoder will also produce an image of half the size in each dimension. This change of resolution would typically be managed at the receiver device. In fact, as most displays have mechanisms for rendering video frames at the resolution of the screen, regardless of the decoded picture size, the specifics of how that resampling is done on an input picture frame actually might not be transmitted in the bitstream. This may be referred to as an "outer" resampling process, which thus need not be normative in a standard. This is especially true for I frames, as their processing does not depend on other frames.

However, this process may be more complicated for predicted frames (e.g., P frames, B frames) due to the prediction process. As certain video frames are resampled before encoding, they become unusual reference frames in the decoded picture buffer (DPB), having a resolution different than the typical pictures. Thus, the stream of reference frames may have varying resolutions, and using them to predict new frames may require resampling the reference frames to match the size of the frame to be predicted. This may be referred to as an "inner" resampling process. Since this inner resampling process is carried out at both the encoder and the decoder, and identically, it must be normative. This process is thus sometimes called reference picture resampling.

Thus, the encoding and decoding of video frames of a video bitstream may involve two resampling processes, one for the actual pictures to be encoded ("outer"), which can but need not be normative, and a second for the reference pictures ("inner"), which is normative due to being explicitly carried out in the decoding process (e.g., to match the encoding process). In some embodiments, a transmission system can choose to use the same process for both the other and inner resampling processes. But since that is not required to make this process work, codec designs typically restrict design elements to only specify what is essential in a decoding process.

In some embodiments, the resampling process for the reference pictures entails two things: details of signaling of the use of resampling of reference pictures, as well as of the resampling filters used and the exact derivation of the resampled samples from the input samples. Both of these elements are discussed in greater detail below.

In some embodiments, in order to effectively carry out resampling of video frames, information is provided within the video bitstream to serve as (a) a way to signal that a frame is resampled, at least for the reference frames; this is accomplished by signaling a flag in the metadata that is embedded in a bitstream in the form of special markers or flags in the sequence parameter set (SPS) and picture parameter set (PPS); and (b) a precise mechanism for carrying out the resampling, e.g., indicating resampling filters, and the process indicating output samples as a function of input samples and the filters.

Among the design goals in developing modern codecs is to keep the signaling processes to a minimum, while still providing the generality of usage desired in applications. Elements of the signaling scheme discussed below have been adopted into ITU|ISO/IEC Versatile Video Codec (VVC) standards, and contain the following aspects:

max picture size signaling in SPS,
actual picture size and conformance window signalling moved to PPS,
scaling ratio is defined based on the output picture size after cropping,
resampling is done on a block basis using interpolation filters, or Lanczos filters.

The proposed signaling scheme provides a solution for adaptive resolution change (ARC) for video bitstreams with the following features: (a) support for arbitrary rational number resampling ratio, (b) support for spatial resampling of both intra and inter pictures (I as well as P and B), (c) support for reference picture resampling based on the dimensional ratio of the reference picture to the current picture, and (d) support for motion vector rescaling, so that motion vectors pointing to reference pictures with different sizes can be used for prediction.

Normally, since video frames are expected to be of a fixed size, the size of video frames is signaled just once at the beginning of a sequence, in the SPS, and not in the PPS. This may be done to save on overhead and bandwidth, since PPS data must be sent with each frame. However, in accordance with some embodiments, to allow for frames within a bitstream to be able to vary in size, the parameter sets are modified to signal frame size information at the frame level in the PPS as well. Table 1 shows proposed changes to the PPS signaling which includes additional parameters to capture the intended new size parameters of a picture. This is sufficient information for prediction processing with reference pictures, since if the size of what each frame is as encoded is known, how reference pictures or at least their block-based motion information must be resized can be calculated. As shown in Table 1, the parameters set includes an adaptive_resolution_flag, corresponding to a one-bit flag to first indicate the use of adaptive resolution (0=FALSE; 1=TRUE), and if TRUE, further syntax elements to indicate the new size in height and width.

TABLE 1

| | Descriptor |
|---|---|
| pic_parameter_set_rbsp( ) { | |
|     pps_pic_parameter_set_id | ue(v) |
|     pps_seq_parameter_set_id | ue(v) |
|     output_flag_present flag | u(1) |
|     single_tile_in_pic_flag | u(1) |
|   adaptive_resolution_flag | u(1) |
|     If(adaptive_resolution_flag) { | |

TABLE 1-continued

| | Descriptor |
|---|---|
|       resampled_pic_width_in_luma_samples | ue(v) |
|       resampled_pic_height_in_luma_samples | ue(v) |
|    } | |
|    if( !single_tile_in_pic_flag ) { | |
|       ... | |
| } | |

In some embodiments, the use of reference picture resampling is signaled at the sequence parameter set (SPS) level using one or more one-bit flags, indicating whether or not adaptive resolution (or reference picture resampling) is used in the bitstream. In some embodiments, these flags may be similar to the adaptive_resolution_flag described above, and may be incorporated in a combination of two flags, sps_ref_pic_resampling_enabled_flag, which indicates that adaptive resolution may be used within the bitstream, and sps_res_change_in_clvs_allowed_flag, which indicates that resolution change can be done layer-wise if layered coding is used. As such, the decoder, upon receiving a bitstream, may analyze the SPS for these sps_ref_pic_resampling_enabled_flag and sps_res_change_in_clvs_allowed_flag flags, and if the presence of adaptive resolution in the bitstream is indicated, analyze the PPS for the picture sizes of individual frames within the bitstream to determine which have been resized.

In some embodiments, for each individual frame of the bitstream, a picture size of the frame is indicated in the PPS. This may be signaled with the syntax elements pps_pic_width_in_luma_samples, and pps_pic_height_in_luma_samples, which are just a renaming of the resampled_pic_width_in_luma_samples and resampled_pic_height_in_luma_samples syntax elements shown in Table 1. Note that by explicitly signaling the size of the (possibly resampled) current frame, and already having the notional size of video frames on hand (from SPS data), arbitrary resizing of video frames is permitted, and thus also reference frames and blocks therein. In addition, by comparing the notional size of the video frames (as indicated in the SPS) with the signaled size parameters of the PPS of a given video frame, whether the given video frame was resampled can be determined, as well as a resampling factor along each dimension for the given video frame. This allows for additional flexibility over signaling schemes in which rescaling is limited to certain predetermined factors.

In addition, since processing a video frame by a resampling filter may alter the size of the frame beyond what may be desired (e.g., by adding a few samples in each direction due to the size of the filter), the signaled parameters may further specify which part of the frame to keep (called the conformance window). In some embodiments, if pps_conformance_window_flag is true, the conformance window is signaled by signaling offsets at left, right, top and bottom of the frame. Table 2 shows the signaling in the picture parameter set for each frame that may be used in some embodiments.

TABLE 2

| | Descriptor |
|---|---|
| pic_parameter_set_rbsp( ) { | |
|    pps_pic_parameter_set_id | u(6) |
|    pps_seq_parameter_set_id | u(4) |
|    pps_mixed_nalu_types_in_pic_flag | u(1) |

TABLE 2-continued

| | Descriptor |
|---|---|
|    pps_pic_width_in_luma_samples | ue(v) |
|    pps_pic_height_in_luma_samples | ue(v) |
|    pps_conformance_window_flag | u(1) |
|    if( pps_conformance_window_flag) { | |
|       pps_conf_win_left_offset | ue(v) |
|       pps_conf_win_right_offset | ue(v) |
|       pps_conf_win_top_offset | ue(v) |
|       pps_conf_win_bottom_offset | ue(v) |
|    } | |
|    pps_scaling_window_explicit_signalling_flag | u(1) |
|    if( pps_scaling_window_explicit_signalling_flag) { | |
|       pps_scaling_win_left_offset | se(v) |
|       pps_scaling_win_right_offset | se(v) |
|       pps_scaling_win_top_offset | se(v) |
|       pps_scaling_win_bottom_offset | se(v) |
|    } | |

As shown in Table 2, pps_pic_width_in_luma_samples and pps_pic_height_in_luma_samples specify a size of the current video frame corresponding the PPS (e.g., height and width in units of luma samples). The pps_conformance_window_flag specifies if conformance cropping window offset parameters are present in the PPS. The pps_scaling_window_explicit_signalling_flag specifies if scaling window offset parameters are present in the PPS. In some embodiments, a scaling window may signal a potential subregion of the video frame to be scaled.

In some embodiments, the PPS of a given video frame may explicitly signal whether the given frame has been rescaled (e.g., using a flag such as the adaptive_resolution_flag). In other embodiments, whether the given video frame has been rescaled is determined implicitly (e.g., by comparing the size parameters given in the PPS of the given frame with the notional size signalled in the SPS of the bitstream).

Having this information for both a reference picture and the current picture provides sufficient information to rescale reference picture and associated motion-based prediction.

Figure 4:
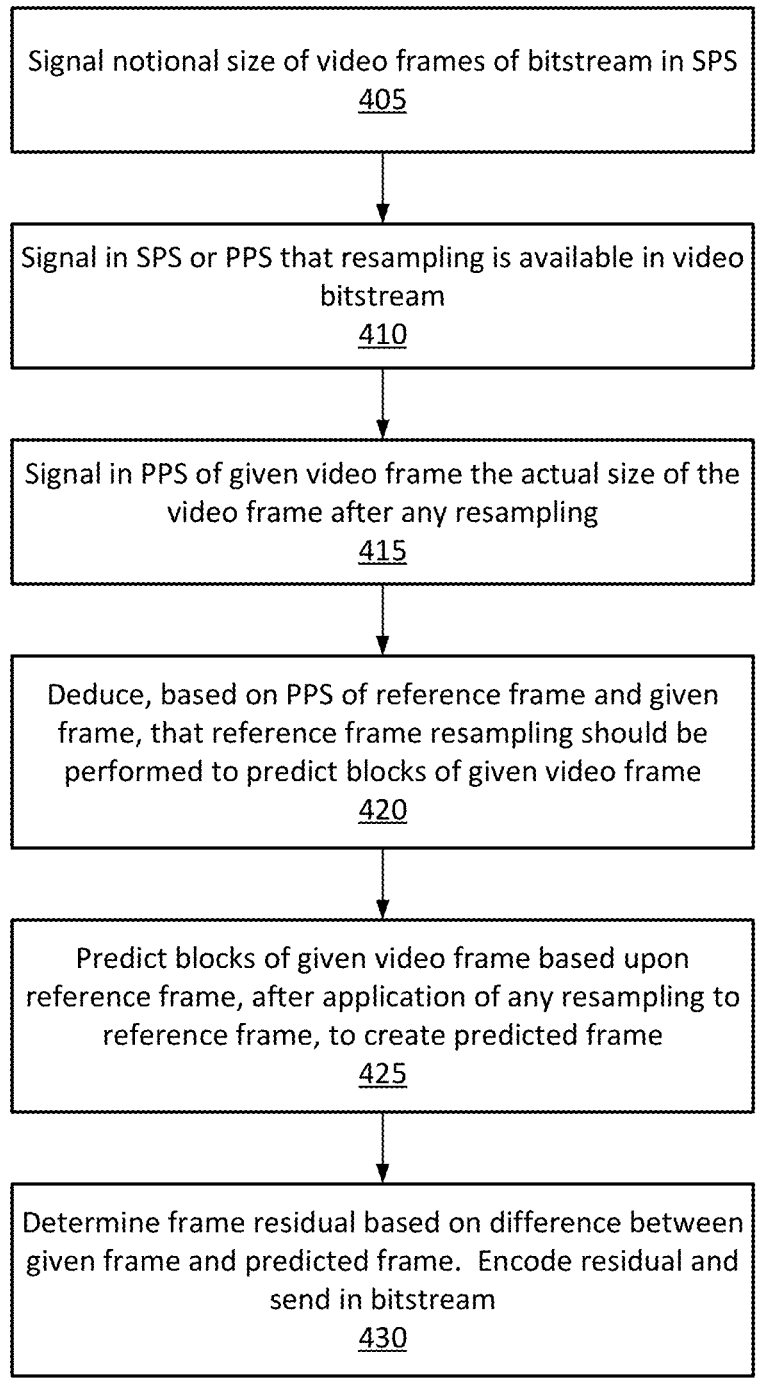
FIG. 4 is a flowchart of a process for encoding video frames of a video bitstream with adaptive resolution change, in accordance with some embodiments.

FIG. 4 is a flowchart of a process for encoding video frames of a video bitstream with adaptive resolution change, in accordance with some embodiments. At 405, the video encoder signals at the sequence parameter level of the video bitstream a notional size of video frames of the bitstream.

At 410, the video encoder signals at the sequence or picture parameter set level that resampling is enabled in the video bitstream. For example, the video encoder may signal within the sequence parameter set a flag indicating adaptive resolution changes of frames within the bitstream (e.g., sps_ref_pic_resampling_enabled_flag and/or sps_res_change_in_clvs_allowed_flag, as discussed above), or within the picture parameter set of an individual frame indicative adaptive resolution change of that frame (e.g., adaptive_resolution_flag). In some embodiments, the video encoder signals an explicit flag in the sequence parameter set indicating that resampling is enabled, and implicitly signals that resampling has been performed for certain video frames through size parameters signaled in the picture parameter sets of the frames.

At 415, the video encoder signals, in the PPS for a given video frame the actual size of the video frame after any optional resampling. For example, the video encoder may signal, if the given video frame has a flag indicating adaptive resolution change (e.g., adaptive_resolution_flag for the frame is True), the height and width of the video frame after resampling.

The video encoder encodes the given video frame. At 420, the video encoder deduces that data from reference frames, at either block or full-frame level, may require resampling to properly predict blocks in the given video frame (and thus to predict the full video frame). For example, the video encoder may compare the size of the given video frame after resampling to a size of the reference frame to be used for predicting blocks of the given video frame (via parameters signalled in the PPS of the given frame and the reference frame), and deduce that resampling is needed to predict blocks of the given video frame. In addition, the video encoder deduces an amount of resampling required, if any (e.g., based on the respective sizes of the given video frame and the reference frame).

At 425, the video encoder carries out predictions of the given video frame (at the block or full frame level) based upon the reference frame, by first applying any required resampling to the reference frame data, to create a predicted frame. For example, the video encoder may resample the reference frame or block to a resolution matching that of the given video frame or block, from which blocks of the given video frame can be predicted. When all blocks are predicted, a predicted frame is created by stitching together all predicted blocks.

At 430, the difference between the given frame and the predicted frame, called the frame residual, is computed, encoded, and sent in the bitstream.

The process illustrated in FIG. 4 may be performed for each of a plurality of video frames, in order to produce an encoded bitstream.

In some embodiments, the video encoder performs inter-prediction at the block level, wherein the blocks may be of an arbitrary size and shape. Specific video standards may limit the size, shape, and the range of motion for which predictors can be applied. The video encoder, for a block of the given frame, selects a plurality of candidate blocks of reference frames for which to perform prediction. Each of the plurality of candidate blocks may be resampled to the perspective resolution of the block of the given video frame, to evaluate which of the candidate blocks will be used for prediction.

In some embodiments, the video encoder performs prediction at the frame level. The video encoder may, for the given video frame, select a plurality of candidate frames for which to perform prediction. Each of the plurality of reference frames may be resampled to the resolution of the given video frame, to evaluate which of the candidate frames will be used for prediction.

In some embodiments, since motion for a given block is likely to be similar to motion for nearby blocks (spatially or temporally), motion information of a given block may be predicted from nearby blocks, and only the difference encoded and signaled. Moreover, motion information may be signaled either explicitly or implicitly. In some embodiments, the motion information is signaled in an explicit mode, wherein given a current block, motion vector predictors may be developed from spatial and temporal neighboring blocks of the current block, and encoded and signaled together with a motion vector difference (the difference between the final motion vector and the motion vector predictor). In some embodiments, a method for efficient motion data handling may be used, which may be called advanced motion vector prediction (AMVP), in which certain restrictions may be applied to motion search ranges and candidate motion vectors based on which blocks they are derived from, to streamline the prediction process.

In some embodiments, the motion information may be signaled in an implicit mode (as in HEVC and VVC), which may be called a merge mode, wherein it is derived from a candidate list of motion vector predictors. It is a way of efficiently sharing a small indexed set of motion vector predictors among a set of contiguous blocks. In some embodiments, the video encoder constructs a merge candidate list for inter-prediction at the coding unit (CU) level for adaptive resolution change (ARC) video coding, comprising a plurality of motion vector predictor (MVP) candidates, which may include spatial MVP candidates and/or temporal MVP (TMVP) candidates. In some embodiments, the spatial MVP candidates from spatial neighbor CU's are each scaled differently depending on a ratio of the dimensions of their respective reference picture to the current picture. TMVP candidates from collocated CU's may be scaled differently depending on the ratio of the dimensions of their respective reference picture to the current picture.

In some embodiments, for efficiency of signaling, certain restrictions may be imposed. In some embodiments, TMVP candidates are used only when the current and collocated pictures are the same size. In some embodiments, the video encoder performs inter prediction refinement using bi-directional optical flow (BDOF) and/or Decoder-side motion vector refinement (DMVR) when encoding frames of video data. In some embodiments, the encoder enables use of BDOF and DMVR only when the current picture and the collocated pictures for use in prediction are of the same size.

In some embodiments, the video encoder constructs an affine merge candidate list at the CU level for ARC video coding comprising inherited affine merge candidates and/or constructed affine merge candidates. The inherited affine merge candidates from spatial neighbor CU's are scaled differently, based on the ratio of the dimensions of the respective reference pictures to the current picture. In addition, constructed affine merge candidates from spatial neighbor CU's are scaled differently, based on the ratio of the dimensions of the respective reference pictures to the current picture. In some embodiments, the video encoder constructs a combined inter and intra prediction (CIIP) motion vector candidate list for ARC video coding, wherein the candidates for inter prediction of the CIIP are scaled as discussed above.

Figure 5:
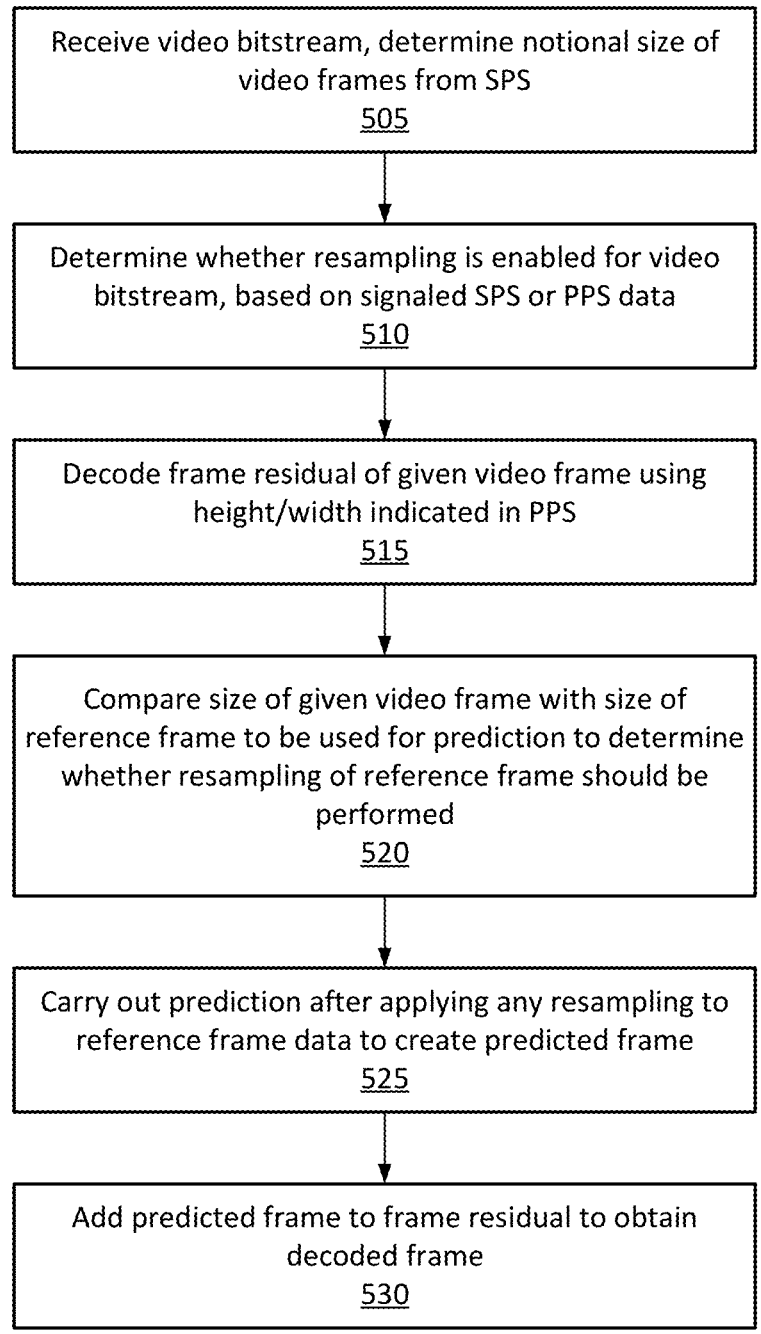
FIG. 5 is a flowchart of a process decoding video frames of a video bitstream with adaptive resolution change, in accordance with some embodiments.

FIG. 5 is a flowchart of a process decoding video frames of a video bitstream with adaptive resolution change, in accordance with some embodiments. At 505, a video decoder receives an encoded video bitstream, and determines a notional size of video frames of the bitstream (e.g., from the SPS of the bitstream).

At 510, the video decoder determines if resampling is enabled for the video bitstream. In some embodiments, the decoder checks the SPS of the bitstream for a flag indicating that the bitstream contains frames with adaptive resolution changes (e.g., sps_ref_pic_resampling_enabled_flag or sps_res_change_in_clvs_allowed_flag). In some embodiments, the decoder checks the PPS of the given video frame to determine if resampling is needed in a given video frame (e.g., adaptive_resolution_flag). In some embodiments, the decoder checks for the adaptive_resolution_flag in the PPS only if the SPS of the bitstream signals that the sps_ref_pic_resampling_enabled_flag or sps_res_change_in_clvs_allowed_flag are true.

At 515, the video decoder decodes the given video frame residual using the width and height given in the PPS of the video frame. For example, the video decoder may decode the given video frame based on the signaled width and height parameters (e.g., pps_pic_width_in_luma_samples and pps_pic_height_in_luma_samples).

At 520, the video decoder compares the size of the given video frame (e.g., height and width) to a size of a reference video frame to be used for predicting blocks of the given video frame. For example, the video decoder may compare the height and width parameters indicated in the PPS of the given video frame and the PPS of the reference frame, and determine that resampling of the reference frame data is needed to carry out predictions for blocks of the given frame, and an amount of resampling needed.

At 525, the video decoder carries out predictions of the blocks of the given frame by applying the determined resampling to the data of the reference frame (at block or full frame level) to generate the predicted frame.

At 530, the video decoder adds the predicted frame to the frame residual to obtain the decoded frame. This may be done frame by frame to decode the full bitstream.

As such, the video decoder is able to receive a video bitstream where the frames of the bitstream have been adaptively resampled (e.g., to provide for more uniform bitrate), and by analyzing parameters indicated in the picture parameter sets of each frame of the bitstream, decode video frames based on reference frames even when the video frame and reference frame have different resolutions (e.g., by resampling the reference frame data to a resolution from which the video frame data can be predicted).

In some embodiments, a set of resampling filters are provided at the encoder and decoder for resampling received image data. The resampling filters include a single-phase, 0-phase downsampler, [1, 0, −8, 16, 46, 16, −8, 0, 1], as well as a 32-phase upsampler, an example of which is shown in Table 3 as a 32-phase 4-tap upsampling filter. Note that the 16-th filter of the 32-phase upsampler, which is the 0-phase upsampling filter, is [−4 36 36 −4], which is the same (up to a scale factor) as [−1 9 9 −1]. The 0-phase filter of a multi-phase filter is typically the most important.

In some embodiments, the entire 32-phase filter is based on first deriving the 0-phase filter, and then deriving all the other phases by certain spline-based interpolation processes from it. Example methods for developing multi-phase filters are discussed in U.S. Pat. No. 8,155,462, which are hereby incorporated by reference in its entirety. In some embodiments, since filters are typically normalized so that they sum to 1 in applications (so that they don't change the total signal energy), scale factors are usually immaterial. Moreover, filter coefficients are typically chosen so that their sum (which becomes the divisor) equals a power of 2 (a dyadic number), so that the normalization is accomplished by a simple bit shift. In some embodiments, the central 0-phase filter [−1 9 9 −1] is based on the filter [−1 0 9 16 9 0 −1]. First, note for example that these filters sum to 16 and 32, respectively.

Figure 3:
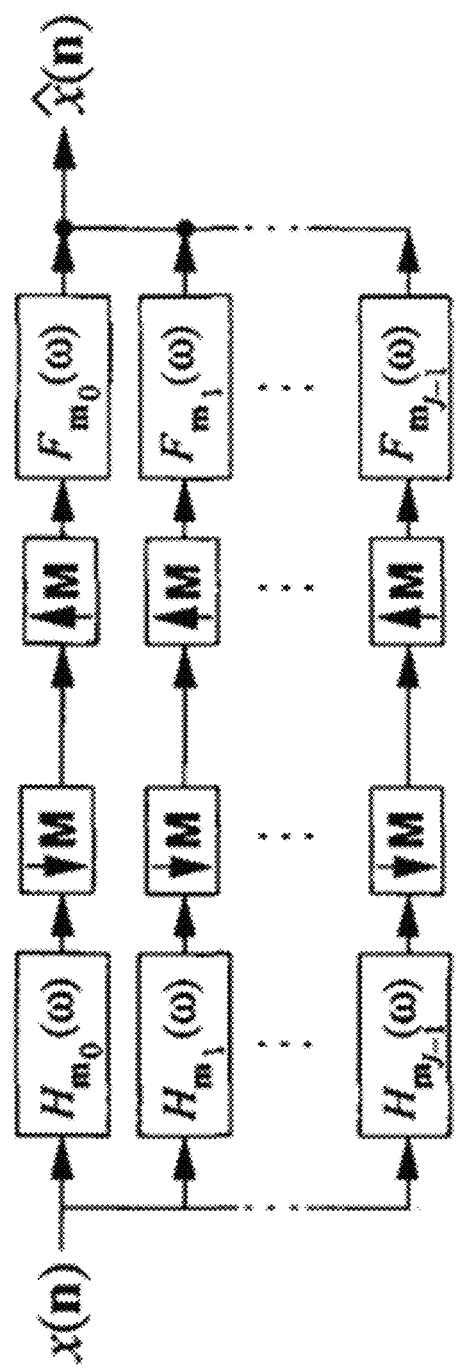
FIG. 3 illustrates an M-channel filter bank comprising downsampling and upsampling filters.

To see that the filter [−1 0 9 16 9 0 −1], when applied as an upsampling filter, is in fact identical to [−1 9 9 −1] as applied on a signal, one has to understand the two distinct sets of notations that are in common use, which have a simple difference. In deriving the resampling filters, the standard notation for multi-rate filtering may be followed, e.g., as described in T. Chen, P. Vaidyanathan, "Multidimensional Multirate Filters and Filter Banks Derived from One-Dimensional Filters," IEEE Trans. Signal Proc., vol. 41, No. 5, May, 1993, which includes FIG. 3, which illustrates an M-channel filter bank, showing that downsampling filters are applied before the downsampling (keeping every Mth element), while upsampling filters are applied after upsampling (by inserting (M−1) zeros in between signal points). This is most natural in the case M=2, with a two-channel filter bank.

For example, in the case of upsampling by 2, a signal with intermediate elements: [ . . . , a, b, c, d, . . . ] is upsampled by zeros to [ . . . , a, 0, b, 0, c, 0, d, . . . ]. When the filter [−1, 0, 9, 16, 9, 0, −1] is applied, a result of [ . . . , −a+9b+9c−d, . . . ] is obtained, which is mathematically the same as the filter [−1, 9, 9, −1] applied on values in the original signal, prior to upsampling with zeros—which would be an alternative notation for designating an upsampling filter. That condensed notation for upsampling may be used in the AVC, HEVC, and VVC standards texts. Such filters may be designed for multi-purpose, and can be used in a variety of contexts, either as a downsampler or as an upsampler, and satisfy certain optimization criteria.

TABLE 3

| Fractional sample position p | Upsampling filter coefficients | | | |
|---|---|---|---|---|
| | p [0] | p [1] | p [2] | p [3] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

In some embodiments, a filter may be used which is a slight variation of previously known filters, often for purposes of computational expedience or slight adjustment of frequency response. Now referring to the resampling notation used in the standards texts, consider the filter [−1 −1 9 25 25 9 −1 −1]. For convenience, this 8-tap filter can be reduced to a shorter 4-tap filter, in several ways. For example, one could just retain the central 4-tap portion, [9, 25, 25, 9], and it would have characteristics somewhat similar to the full 8-tap. However, that would entail a divisor of 68 (the sum of all coefficients) to normalize the filter, which is not a power of two, while the original 8-tap filter taps sum to 64, a power of 2. To get the same benefit on the shorter 4-tap version, a cleaner, more effective truncation is to sum the outside 3 terms of the 8-tap filter, [−1 −1 9], to just the number "7", obtaining [7 25 25 7], whose divisor is again 64. This filter is also a closer match to the original 8-tap filter in frequency response; this exact filter is also used as the 0-phase filter of a 32-phase interpolation filter in the VVC standard.

In summary, by signaling the use of reference picture resampling and parameters related to the resampling (e.g., conformance window parameters), frames of a video can be selectively and adaptively resampled, and the decoder, upon receiving the video bitstream, will be able to compare the levels of resampling of different frames to determine whether resampling is needed in order to properly decode blocks of the video bitstream. Resampling may be performed using a 32-phase upsampling filter. That multi-phase filter is derivable from the 0-phase filter (filter 16 in Table 3), which is fundamental. That 0-phase filter, [−1, 9, 9, −1], is mathematically identical to the filter [−1, 0, 9, 16, 9, 0, −1] when it is used as an upsampling filter, simply due to the differences in notation between what is commonly used in the open literature and what is practiced in recent standards documents. And in terms of the notation used in the standards texts, the filter derived1=[7 25 25 7], a variant of the longer fv1=[−1 −1 9 25 25 9 −1 −1] filter, may be in use in the standards.

Figure 6A:
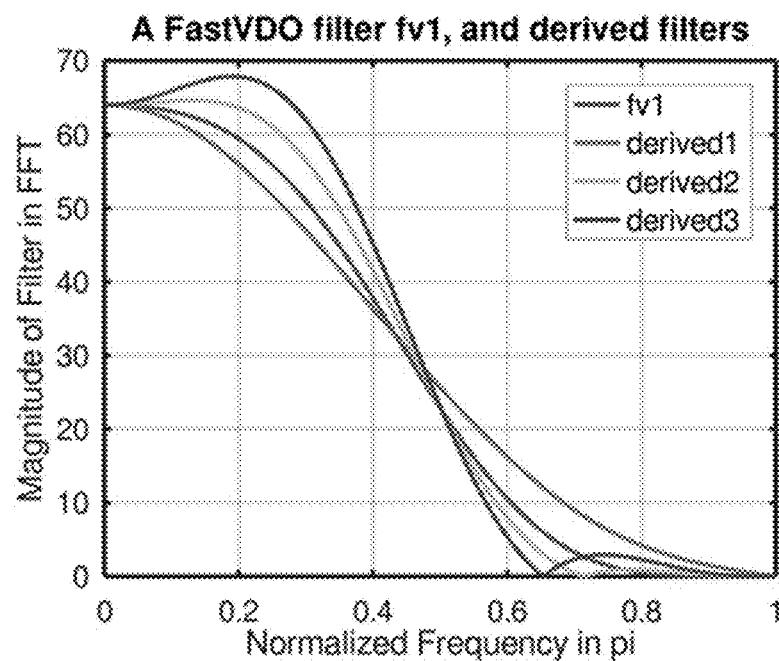
FIGS. 6A and 6B are comparisons of the frequency response curves of a base filter and closely related filters derived from the base filter by elementary methods, in accordance with some embodiments.

As another embodiment for the same [−1 −1 9 25 25 9 −1 −1] filter, one could shift the inner and outer coefficients either towards or away from 0, say by 1 or 2 values. As an example, considering away from zero by 1 or 2 values yields derived2=[−2 −2 10 26 26 10 −2 −2], and derived3=[−3 −3 11 27 27 11 −3 −3] respectively, modestly adjusting the frequency response of the filter, and not at all the divisor, 64 in all cases. Some of these variants may be in use in standards such as VVC. FIG. 6A shows frequency response curves of the filter fv1, and the three derived filters, in accordance with some embodiments.

Figure 6B:
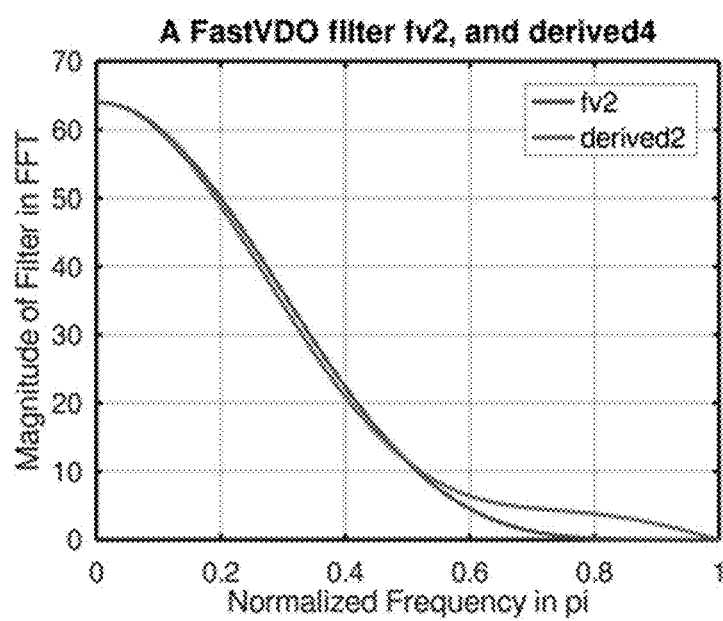

As a final example, the filter derived4=[3 9 20 20 9 3], which may be used in standards, can be seen numerically to be a close approximation of the filter fv2=[2 10 20 20 10 2] (a single value shifted between the outer two filter taps), and both have 64 as divisor; the latter design, which is cleaner and requires 2 less additions, can be further simplified to [1 5 10 10 5 1] with 32 divisor. FIG. 6B shows frequency response curves of fv2 and derived4 filters, in accordance with some embodiments. As shown in FIG. 6B, the two filters fv2 and derived4 are close in frequency response. One skilled in the art can construct many more useful filters by these and other similar methods based on previously developed filters.

Computer Architecture

Figure 7:
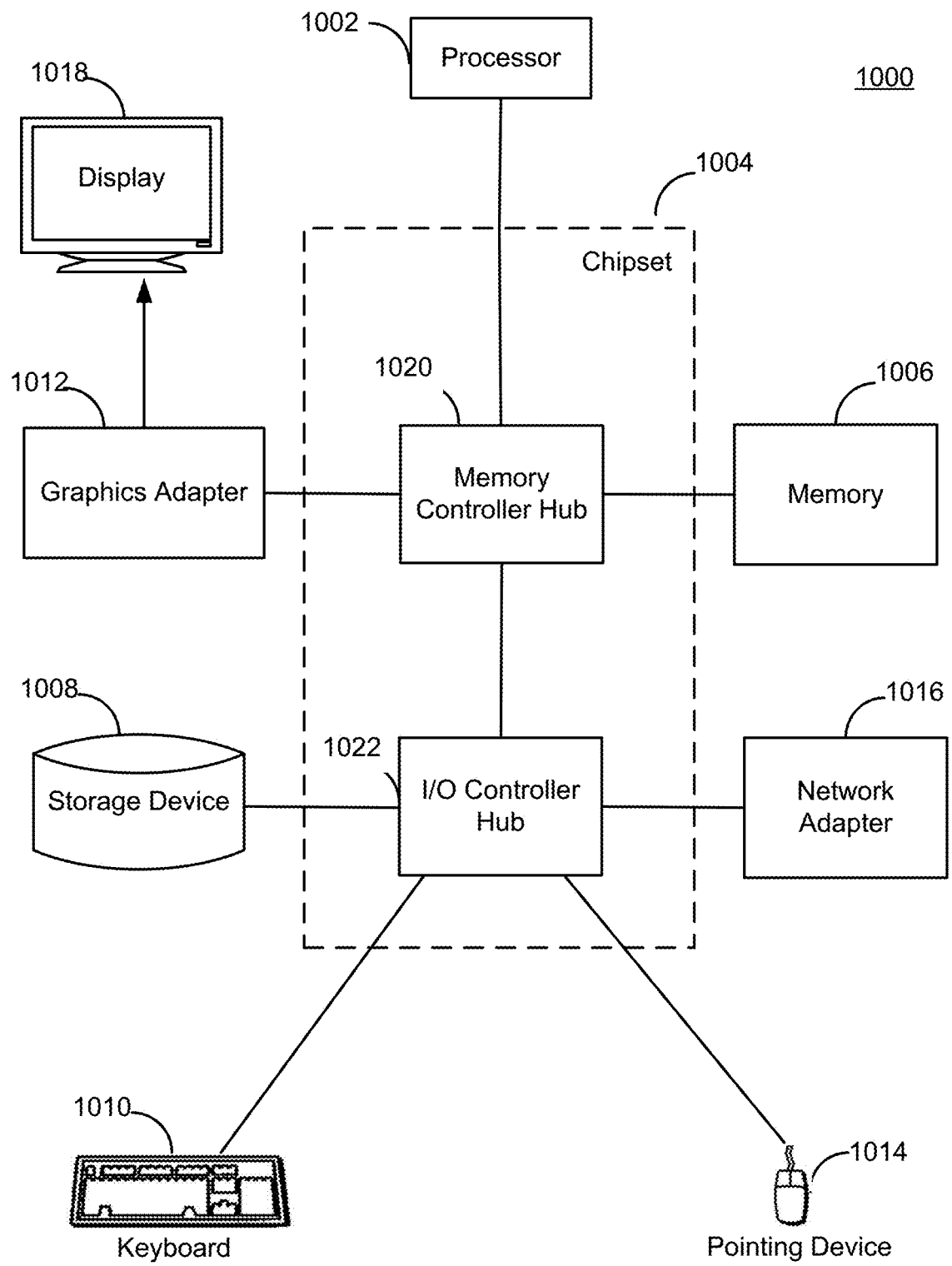
FIG. 7 is a high-level block diagram illustrating an example computer, in accordance with some embodiments.

FIG. 7 is a high-level block diagram illustrating an example computer 1000, such as a computer system 110 shown in FIG. 1. The computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 2020, and a display 1018 is coupled to the graphics adapter 1012. A storage device 1008, keyboard 1010, pointing device 1014, and network adapter 1016 are coupled to the I/O controller hub 2022. Other embodiments of the computer 1000 have different architectures.

The storage device 1008 is a non-transitory computer-readable storage medium such as a hard drive, compact disk read-only memory (CD-ROM), DVD, or a solid-state memory device. The memory 1006 holds instructions and data used by the processor 202. The pointing device 1014 is a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to one or more computer networks.

The computer 1000 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1008, loaded into the memory 1006, and executed by the processor 1002.

The types of computers 1000 used as the computer systems 110 of FIG. 1 can vary depending upon the embodiment and requirements. For example, the computer system 110A used for encoding might include one or more blade computers lacking displays, keyboards, and/or other devices shown in FIG. 2. Likewise, the computer system 110B used for decoding might comprise a mobile phone or other such device with a touch-sensitive display and limited processing power.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for encoding video frames, comprising:
   at a video encoder, signaling, at a sequence parameter level, a notional size of video frames of a video bitstream and that resampling is enabled in the video bitstream;
   signaling, for a given video frame, an actual size of the given video frame after optional resampling, in terms of height and width, at the picture parameter set level of the given video frame;
   signaling, at the picture parameter set level, a conformance window or a scaling window, comprising left, right, top and bottom offsets of the signaled conformance window or scaling window;
   deducing, at the video encoder, a level of resampling to apply to data from a reference frame, at either block or full-frame level, in order to properly predict blocks in the given video frame or the full given video frame, based upon the actual size signaled at the picture parameter set level and the notional size signaled at the sequence parameter level, wherein the level of resampling is not explicitly signaled in the sequence parameter level or the picture parameter set level;
   carrying out, at the video encoder, extraction of the signaled conformance window or scaling window, according to the signaled offsets;
   carrying out, at the video encoder, one or more predictions by first applying a resampling process on the reference frame data at the deduced level, at the block or full frame level, to create a predicted frame;
   subtracting the predicted frame from the given frame to create a frame residual; and
   encoding the frame residual and sending that data in the video bitstream.

2. The method of claim 1, wherein the reference frame is resampled at the block level, and wherein blocks of the reference frame are of arbitrary shape and size.

3. The method of claim 1, further comprising:
   identifying, for a block in the given video frame, a plurality of candidate blocks associated with one or more reference frames; and
   resampling each of the plurality of candidate blocks to a resolution of the block of the given video frame.

4. The method of claim 3, further comprising:
   for a block in a given video frame, selecting a set of candidate motion vector predictors from the plurality of candidate blocks; and
   selecting a motion vector from the set of candidate motion vector predictors as a base motion vector for the block.

5. The method of claim 1, in which advanced motion vector prediction is applied by imposing certain restrictions on motion search ranges or considerations of certain candidate motion vectors based on the blocks they are derived from.

6. The method of claim 1, further comprising:
   constructing a merge candidate list for inter prediction at the coding unit (CU) level for adaptive resolution change (ARC) coding of the given video frame, wherein the merge candidate list comprises spatial and temporal motion vector predictor (MVP) candidates for a given CU;
   modifying the spatial and temporal MVP candidates by:
      scaling each of the spatial MVP candidates from spatial neighbor CU's, based on the respective ratios of dimensions of their respective reference frame with the given video frame; and
      scaling each of the temporal MVP candidates from collocated CU's in reference frames, based on the respective ratios of dimensions of their respective reference frame with the given video frame; and
   designating a motion vector for the CU by selecting an index of a motion vector predictor from the candidate list, and sending the index in the video bitstream.

7. The method of claim 6, wherein the merge candidate list is constructed to select temporal MVP candidates only when the CU of the given video frame and the collocated CU of the temporal MVP candidate have the same size.

8. The method of claim 6, further comprising enabling Bi-directional optical flow (BDOF) & Decoder side motion vector refinement (DMVR) for a temporal MVP candidate if the given video frame and a collocated picture of the temporal MVP candidate are of the same size.

9. The method of claim 1, further comprising:
   constructing an affine merge candidate list at the CU-level for ARC coding, the affine merge candidate list comprising inherited affine merge candidates and constructed affine merge candidates;
   scaling the inherited and constructed affine merge candidates, wherein:
      the inherited affine merge candidates from spatial neighbor CU's are scaled differently depending on the ratio of the dimensions of their respective reference video frame; and
      the constructed affine merge candidates from spatial neighbor CU's are scaled differently depending on the ratio of the dimensions of their respective reference video frame.

10. The method of claim 9, wherein the affine merge candidate list is used for combined inter and intra prediction (CIIP) for ARC coding of the video bitstream.

11. A method for decoding video frames, comprising:
    at a video decoder, identifying, from a sequence parameter set of a video bitstream, a notional size of video frames of the video bitstream, and that resampling is enabled for the video bitstream;
    identifying, at the video decoder, from a picture parameter set of a given video frame, an actual size of the given video frame comprising a signaled width and a signaled height;
    identifying, at the video decoder, a conformance window or a scaling window signaled in the picture parameter set of the given video frame, comprising left, right, top and bottom offsets of the signaled conformance window or scaling window;
    decoding, at the video decoder, the given video frame to obtain residual frame data using the signaled width and height given in the picture parameter set of the given video frame, as well as the the signaled conformance window or scaling window and their signaled offsets;
    decoding, at the video decoder, the signaled frame prediction data, the decoding comprising deducing a level of resampling for reference frame data of one or more reference video frames, by comparing the signaled actual size of the given video frame with a signaled size of the one or more reference video frames;

carrying out predictions to generate predicted data by first applying the determined level of resampling to the reference frame data, at the block or full frame level;

adding the predicted data, at either block-level iteratively or full-frame level, to the residual data of the given video frame to generate a decoded video frame.

12. A video encoder configured to:

signal, at a sequence parameter level, a notional size of video frames of a video bitstream and that resampling is enabled in the video bitstream;

signal, for a given video frame, an actual size of the given video frame after optional resampling, in terms of height and width, at the picture parameter set level of the given video frame;

signal, at the picture parameter set, a conformance window or a scaling window, comprising left, right, top and bottom offsets of the signaled conformance window or scaling window;

deduce a level of resampling to apply to data from a reference frame, at either block or full-frame level, in order to properly predict blocks in the given video frame or the full given video frame, based upon the actual size signaled at the picture parameter set level and the notional size signaled at the sequence parameter level, wherein the level of resampling is not explicitly signaled in the sequence parameter level or the picture parameter set level;

perform extraction of the signaled conformance window or scaling window, according to the signaled offsets;

perform one or more predictions by first applying a resampling process on the reference frame data at the deduced level, at the block or full frame level, to create a predicted frame;

subtract the predicted frame from the given frame to create a frame residual; and encode the frame residual and sending that data in the video bitstream.

13. The video encoder of claim 12, further configured to resample the reference frame at the block level, wherein blocks of the reference frame are of arbitrary shape and size.

14. The video encoder of claim 12, further configured to:
identify, for a block in the given video frame, a plurality of candidate blocks associated with one or more reference frames; and
resample each of the plurality of candidate blocks to a resolution of the block of the given video frame.

15. The video encoder of claim 12, further configured to apply advanced motion vector prediction by imposing certain restrictions on motion search ranges or considerations of certain candidate motion vectors based on the blocks they are derived from.

16. The video encoder of claim 12, further configured to:
construct a merge candidate list for inter prediction at the coding unit (CU) level for adaptive resolution change (ARC) coding of the given video frame, wherein the merge candidate list comprises spatial and temporal motion vector predictor (MVP) candidates for a given CU;
modify the spatial and temporal MVP candidates by:
scaling each of the spatial MVP candidates from spatial neighbor CU's, based on the respective ratios of dimensions of their respective reference frame with the given video frame; and
scaling each of the temporal MVP candidates from collocated CU's in reference frames, based on the respective ratios of dimensions of their respective reference frame with the given video frame; and
designate a motion vector for the CU by selecting an index of a motion vector predictor from the candidate list, and sending the index in the video bitstream.

17. The video encoder of claim 16, further configured to construct the merge candidate list by selecting temporal MVP candidates only when the CU of the given video frame and the collocated CU of the temporal MVP candidate have the same size.

18. The video encoder of claim 16, further configured to enable Bi-directional optical flow (BDOF) & Decoder side motion vector refinement (DMVR) for a temporal MVP candidate if the given video frame and a collocated picture of the temporal MVP candidate are of the same size.

19. The video encoder of claim 12, further configured to:
construct an affine merge candidate list at the CU-level for ARC coding, the affine merge candidate list comprising inherited affine merge candidates and constructed affine merge candidates;
scale the inherited and constructed affine merge candidates, wherein:
the inherited affine merge candidates from spatial neighbor CU's are scaled differently depending on the ratio of the dimensions of their respective reference video frame; and
the constructed affine merge candidates from spatial neighbor CU's are scaled differently depending on the ratio of the dimensions of their respective reference video frame.

20. The video encoder of claim 19, further configured to use the affine merge candidate list for combined inter and intra prediction (CIIP) for ARC coding of the video bitstream.

* * * * *